(12) United States Patent
Koyanagi

(10) Patent No.: US 6,515,608 B1
(45) Date of Patent: Feb. 4, 2003

(54) DIGITAL-ANALOG CONVERTER AND METHOD, AND DATA INTERPOLATION DEVICE AND METHOD

(75) Inventor: Yukio Koyanagi, Saitama (JP)

(73) Assignee: Yasue Sakai, Urawa (JP)

( * ) Notice: Subject to any disclaimer, the term of this patent is extended or adjusted under 35 U.S.C. 154(b) by 367 days.

(21) Appl. No.: 10/009,652

(22) PCT Filed: Jun. 19, 2000

(86) PCT No.: PCT/JP00/03985

§ 371 (c)(1),
(2), (4) Date: Dec. 10, 2001

(87) PCT Pub. No.: WO00/79686

PCT Pub. Date: Dec. 28, 2000

(30) Foreign Application Priority Data

Jun. 18, 1999 (JP) ............................................. 11-173245

(51) Int. Cl.$^7$ ................................................ H03M 1/66
(52) U.S. Cl. ........................ 341/144; 341/143; 708/313; 364/724.1
(58) Field of Search ................................ 341/144, 143, 341/145, 147, 117; 708/290, 313, 315, 420

(56) References Cited

U.S. PATENT DOCUMENTS

| | | | |
|---|---|---|---|
| 5,012,245 A | | 4/1991 | Scott et al. |
| 5,440,503 A | * | 8/1995 | Maruyama ................ 364/724.1 |
| 5,461,604 A | * | 10/1995 | Hasegawa .................... 369/124 |
| 5,512,895 A | * | 4/1996 | Madden et al. ................ 341/61 |
| 5,748,126 A | * | 5/1998 | Ma et al. ..................... 341/143 |
| 5,859,787 A | * | 1/1999 | Wang et al. ............ 364/724.12 |
| 6,260,053 B1 | * | 7/2001 | Maulik et al. ............... 708/313 |

FOREIGN PATENT DOCUMENTS

| | | |
|---|---|---|
| JP | 6-244679 | 9/1994 |
| JP | 11-055076 | 2/1999 |

* cited by examiner

*Primary Examiner*—Brian Young
*Assistant Examiner*—John Nguyen
(74) *Attorney, Agent, or Firm*—Dellett & Walters

(57) ABSTRACT

A digital-analog converter and method for lowering the computational complexity and decreasing the circuit scale, and data interpolating device and method. The digital-analog converter has a fundamental digital waveform generating section 10 for generating a fundamental waveform according to the values of inputted discrete data, a convolution calculating section 20 for carrying out oversampling and convolution of the output from the digital waveform generating section 10, and a D/A converting section 30 for D/A converting the output from the convolution calculating section 20. The amplitude of the fundamental digital waveform is modulated according to the discrete data and the data is combined by convolution. Only by carrying out oversampling and convolution, continuous interpolation values are obtained.

14 Claims, 7 Drawing Sheets

FIG. 4A
FIG. 4B
FIG. 4C
FIG. 4D

F/G. 7
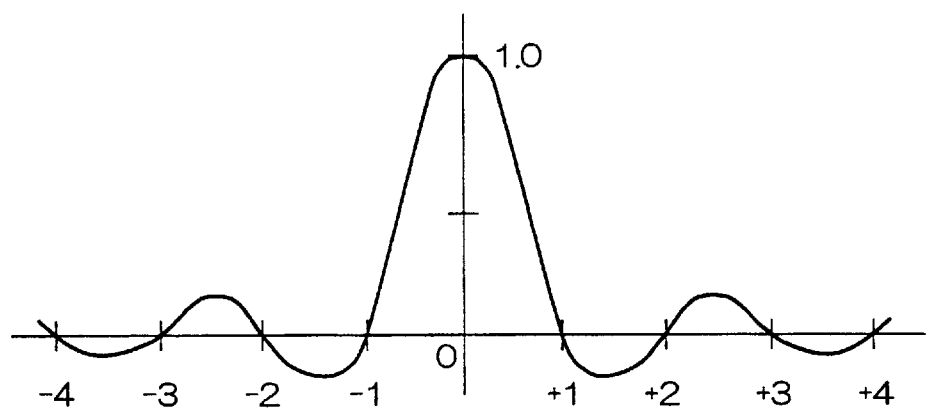
F/G. 8
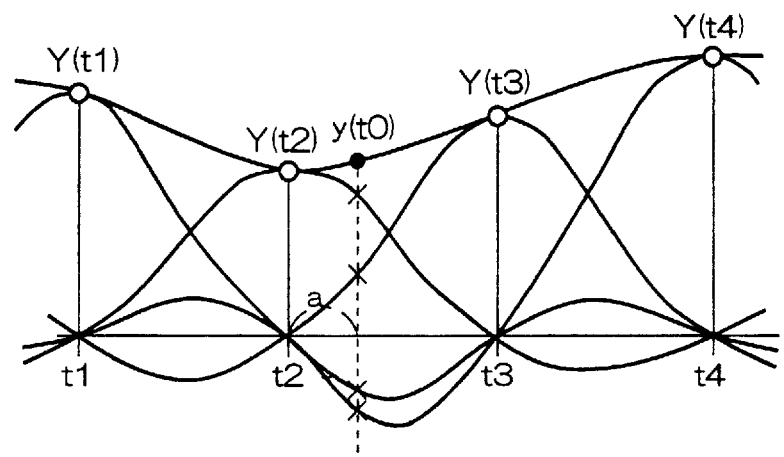

DIGITAL-ANALOG CONVERTER AND METHOD, AND DATA INTERPOLATION DEVICE AND METHOD

TECHNICAL FIELD

The present invention relates to a digital-analog converter (D/A converter) for converting discrete digital data into continuous analog signals and method, and a data interpolating device and method, and more specifically to a D/A conversion of voice data.

BACKGROUND ART

A recent digital audio apparatus, for example, a CD (Compact Disk) player, uses a D/A (digital-to-analog) converter to which an over-sampling technique is applied to obtain a continuous analog audio signal from discrete-digital voice data.

Such a D/A converter generally uses a digital filter to raise a pseudo sampling frequency by interpolating input discrete digital data, and outputs smooth analog audio signals by passing each interpolation value obtained by the digital filter through a low-pass filter after generating a staircase signal waveform with each interpolation value held by the sample holding circuit.

A data interpolating process is performed with a digital filter contained in a D/A converter using a sampling function generally referred to as a sinc function. FIG. 7 is an explanatory graph of a sinc function. This sinc function is obtained when a Dirac delta function is inverse-Fourier-transformed, and is defined as sin ($\pi$ft)/($\pi$ft) where the sampling frequency is f. This sinc function becomes one only at a sample point, where t=0, and zero at all other sample points.

FIG. 8 shows a relation between discrete data and the interpolation value for the data. For example, smoothly changing analog voice signals are sampled at predetermined time intervals, and are then quantized, thereby obtaining discrete voice data as sampling data. AD/A converter receives the discrete digital voice data, performs an interpolating process on the data using the sinc function, and outputs continuous analog voice signals.

In FIG. 8, assume that the values of discrete data at the sampling points t1, t2, t3, and t4 arranged at equal intervals are set as Y(t1), Y(t2), Y(t3), and Y(t4), and an interpolation value y corresponding to a predetermined position t0 (at a distance a from t2) between the sampling points t2 and t3 is to be obtained.

Normally, to obtain the interpolation value y using a sampling function, the value of the sampling function at the interpolating position t0 is obtained for each piece of given discrete data, and then a convolution calculation is performed using the obtained value. To be practical, a fixed peak value is set in the central position of the sampling function for each of the sampling points t1 through t4, and the value (marked withx) of the sampling function at each interpolating position t0 is obtained, and the obtained values are added up.

With the lapse of time, the interpolating position to moves, but the level corresponding each sampling position also changes with the lapse of time. Therefore, the interpolation value y (t0) continuously changes, thereby obtaining continuous analog signals smoothly connecting each piece of the discrete data.

However, the sinc function used in the above mentioned conventional oversampling technology is a function with which the values converge into 0 at the sampling value of ±∞. Therefore, it is necessary to add up the values of sinc functions for the entire discrete data to obtain correct interpolation values. However, actually, a digital filter process is performed with the range of discrete data appropriately limited in view of throughput, circuit size and the like. To obtain acceptable interpolation precision, it is necessary to set a large sampling value range in the calculation, thereby increasing the computational complexity and the circuit scale. Disclosure of the Invention The present invention has been developed to solve the above mentioned problems, and aims at providing a digital-analog converter and method, and a data interpolating device and method capable of reducing the computational complexity and the circuit scale.

The digital-analog converter according to the present invention combines the digital data having fundamental waveforms corresponding to the values of n pieces of input discrete data in the moving average calculation or the convolution calculation, carries out oversampling on the combined digital data values, and further performs the moving average calculation or the convolution calculation on the obtained data values to obtain the digital interpolation values for the discrete data, thereby converting each digital data value containing the interpolation value into an analog quantity.

The digital-analog converter according to another aspect of the present invention includes: combining unit for combining digital data having fundamental waveforms corresponding to the values of n pieces of input discrete data in the moving average calculation or the convolution calculation; oversampling unit for sampling each of the input data values at a frequency double the level at the previous stage on the digital data generated by the combining unit, adding each of the obtained data values to each data value obtained by shifting the data values by a predetermined phase, outputting the result to the subsequent stage, and repeating these steps for several stages; calculating unit for performing the moving average calculation or the convolution calculation on each data value obtained by the oversampling unit at several stages; and D/A converting unit for converting each data value obtained by the calculating unit into an analog quantity.

The digital-analog converter according to a further aspect of the present invention includes: combining unit for combining data by adding digital data having fundamental waveforms corresponding to the values of n pieces of discrete data input in synchronization with a reference frequency clock with the digital data shifted by reference frequency clock; oversampling unit for sampling each of the input data values at a frequency clock double the level at the previous stage on the digital data generated by the combining unit, adding each of the obtained data values to each data value obtained by shifting the data values by a half clock, outputting the result to the subsequent stage, and repeating these steps for several stages; calculating unit for performing the moving average calculation or the convolution calculation at several stages by adding each data value with the value shifted by 1 clock in synchronization with the frequency clock at the final stage of the oversampling unit to each data value obtained by the oversampling unit; and D/A converting unit for converting each data value obtained by the calculating unit into an analog quantity.

The data interpolating device according to the present invention combines the digital-data having fundamental waveforms corresponding to the values of n pieces of input discrete data in the moving average calculation or the convolution calculation, carries out oversampling on the combined digital data values, and further performs the moving average calculation or the convolution calculation on the obtained data values to obtain the digital interpolation values for the discrete data, thereby converting each digital data value containing the interpolation value into an analog quantity.

The data interpolating device according to another aspect of the present invention includes: combining unit for combining digital data having fundamental waveforms corresponding to the values of n pieces of input discrete data in the moving average calculation or the convolution calculation; oversampling unit for sampling each of the input data values at a frequency double the level at the previous stage on the digital data generated by the combining unit, adding each of the obtained data values to each data value obtained by shifting the data values by a predetermined phase, outputting the result to the subsequent stage, and repeating these steps for several stages; calculating unit for performing the moving average calculation or the convolution calculation on each data value obtained by the oversampling unit at several stages; and D/A converting unit for converting each data value obtained by the calculating unit into an analog quantity.

The data interpolating device according to a further aspect of the present invention includes: combining unit for combining data by adding digital data having fundamental waveforms corresponding to the values of n pieces of discrete data input in synchronization with a reference frequency clock with the digital data shifted by reference frequency clock; oversampling unit for sampling each of the input data values at a frequency clock double the level at the previous stage on the digital data generated by the combining unit, adding each of the obtained data values to each data value obtained by shifting the data values by a half clock, outputting the result to the subsequent stage, and repeating these steps for several stages; calculating unit for performing the moving average calculation or the convolution calculation at several stages by adding each data value with the value shifted by 1 clock in synchronization with the frequency clock at the final stage of the oversampling unit to each data value obtained by the oversampling unit; and D/A converting unit for converting each data value obtained by the calculating unit into an analog quantity.

The combining unit includes, for example, n delay unit for sequentially delaying discrete data sequentially input in synchronization with the reference frequency clock by the above mentioned reference frequency clock; and sum-of-products unit for multiplying each data value output from the n delay unit by each gain value corresponding to the fundamental digital waveform, adding up the obtained multiplication results, and outputting the result to the oversampling unit.

The oversampling unit includes, for example, first calculating unit for sampling each data value of the digital data generated by the combining unit with the frequency clock double the reference frequency, and adding each data value to a value obtained by shifting each data value by a half clock; second calculating unit for sampling each data value obtained by the first calculating unit with the frequency clock four times as high as the reference frequency, and adding each data value to a value obtained by shifting each data value by a half clock; and third calculating unit for sampling each data value obtained by the second calculating unit with the frequency clock eight times as high as the reference frequency, and adding each data value to a value obtained by shifting each data value by a half clock.

The calculating unit includes, for example, a plurality of delay unit for sequentially delaying the digital data obtained by the oversampling unit by the value of the frequency clock at the final stage of the oversampling unit; and adding unit for adding up the output from the plurality of delay unit and output the result.

The digital-analog converting method of the present invention includes: a combining step of combining digital data having fundamental waveforms corresponding to the values of n pieces of input discrete data in the moving average calculation or the convolution calculation; an oversampling step of performing oversampling accompanies by the moving average calculation or the convolution calculation on the combined digital data values; a calculating step of obtaining digital interpolation values for the discrete data by performing the moving average calculation or the convolution calculation on the data values obtained by the oversampling; and a D/A converting step of converting each digital data value containing the interpolation values obtained in the above mentioned calculation into an analog quantity.

The data interpolating method of the present invention includes: a combining step of combining digital data having fundamental waveforms corresponding to the values of n pieces of input discrete data in the moving average calculation or the convolution calculation; an oversampling step of performing oversampling accompanies by the moving average calculation or the convolution calculation on the combined digital data values; and a calculating step of obtaining digital interpolation values for the discrete data by performing the moving average calculation or the convolution calculation on the data values obtained by the oversampling.

According to the present invention with the above mentioned configuration, continuous interpolation values for the original discrete data can be obtained only by combining the digital data having fundamental waveforms corresponding to the input discrete data by the moving average calculation or the convolution calculation, and performing the oversampling and the moving average calculation or the convolution calculation on the obtained data values. Therefore, it is not necessary to include sampling values in a large calculation range as in the conventional interpolation calculation performed using the sinc function, thereby reducing the computational complexity and the circuit scale.

BRIEF DESCRIPTION OF THE DRAWINGS

FIGS. 4A–4D shows the operation performed by the convolution calculating section according to an embodiment of the present invention;

FIG. 7 shows a sinc function; and

FIG. 8 shows an interpolating operation.

BEST MODE FOR CARRYING OUT THE INVENTION

The D/A converter according to an embodiment of the present invention does not generate an analog signal through a sample hold circuit and a low pass filter after performing the oversampling process using a digital filter, but combines digital data having fundamental waveforms corresponding to the sampling function depending on the input discrete data, and performs the oversampling process on the obtained data values and the moving average calculation or the convolution calculation, thereby obtaining a digital value for each interpolation value and successfully generating a corresponding analog signal.

Figure 1:
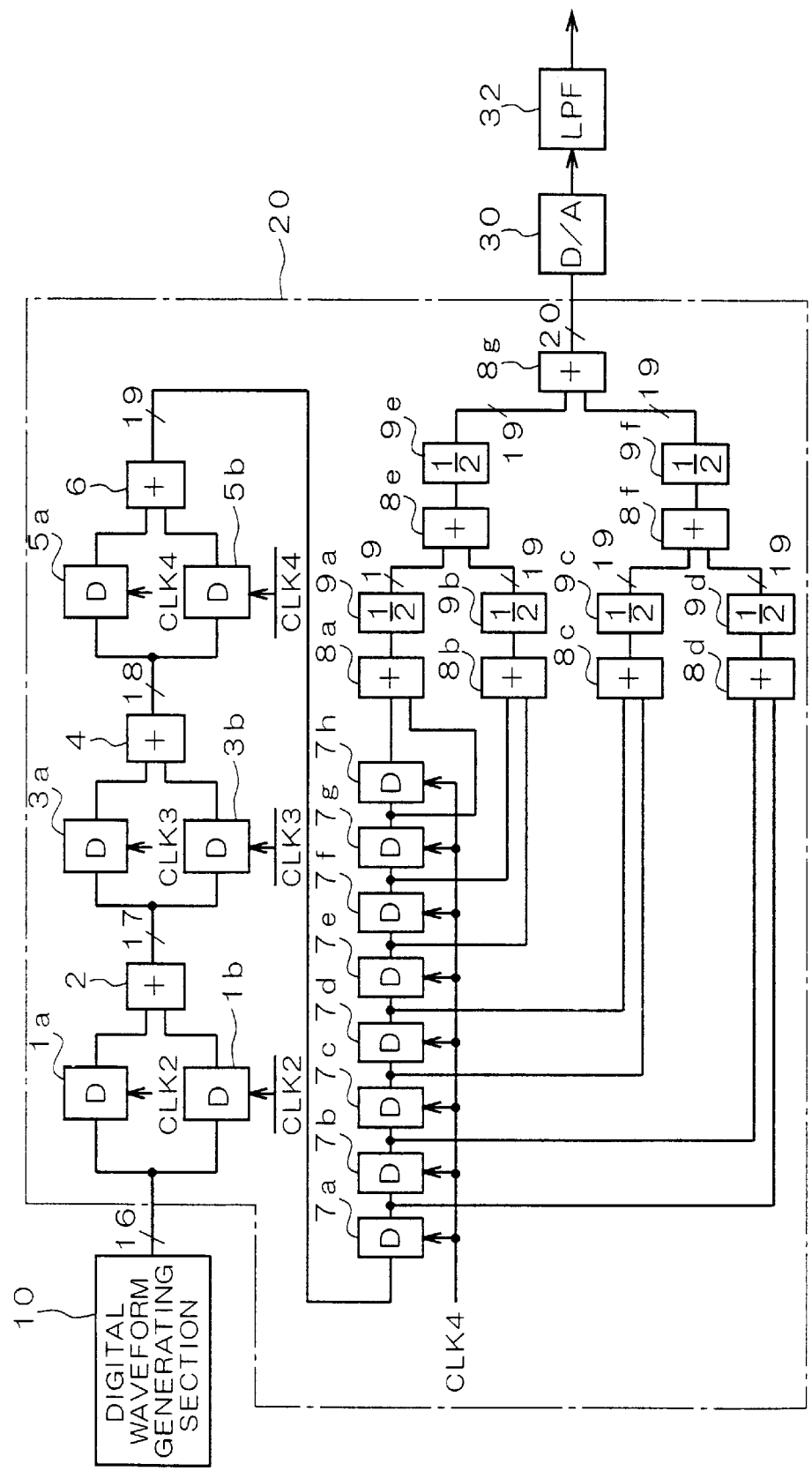
FIG. 1 shows the configuration of the D/A converter according to an embodiment of the present invention.
Figure 2:
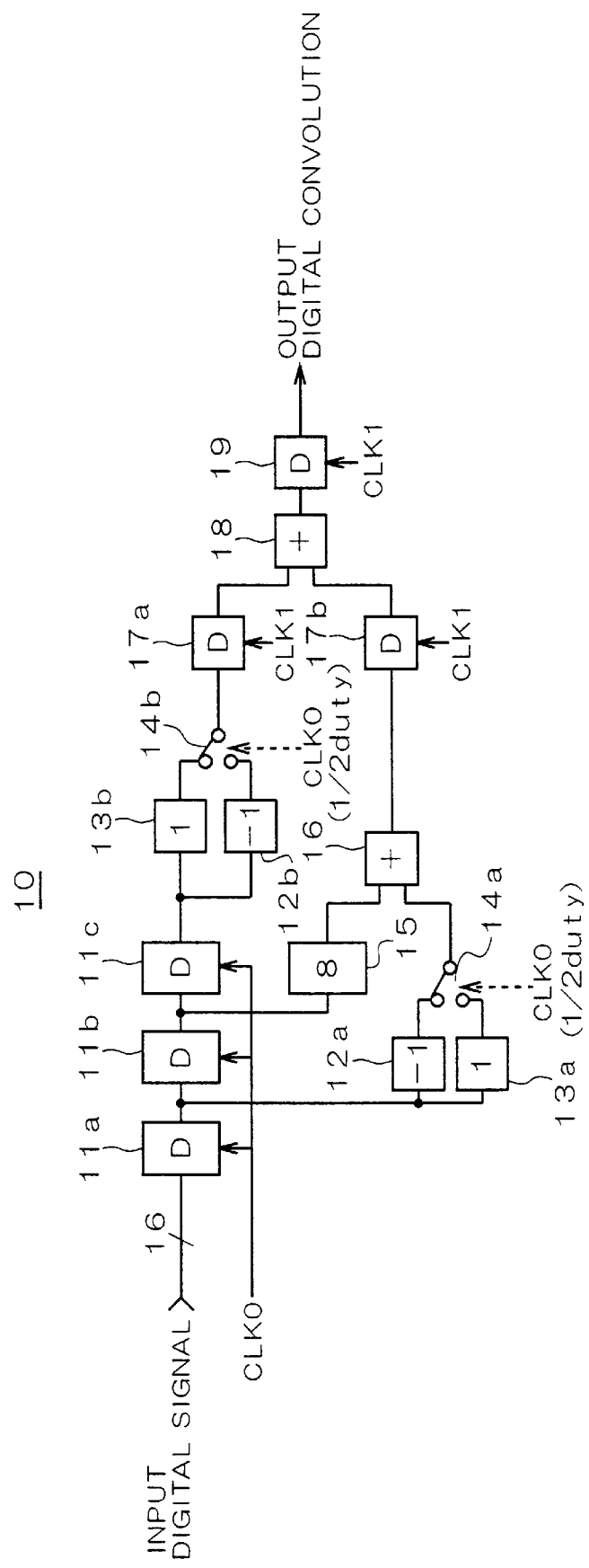
FIG. 2 shows the configuration of the digital waveform generating section shown in FIG. 1.
Figure 3:
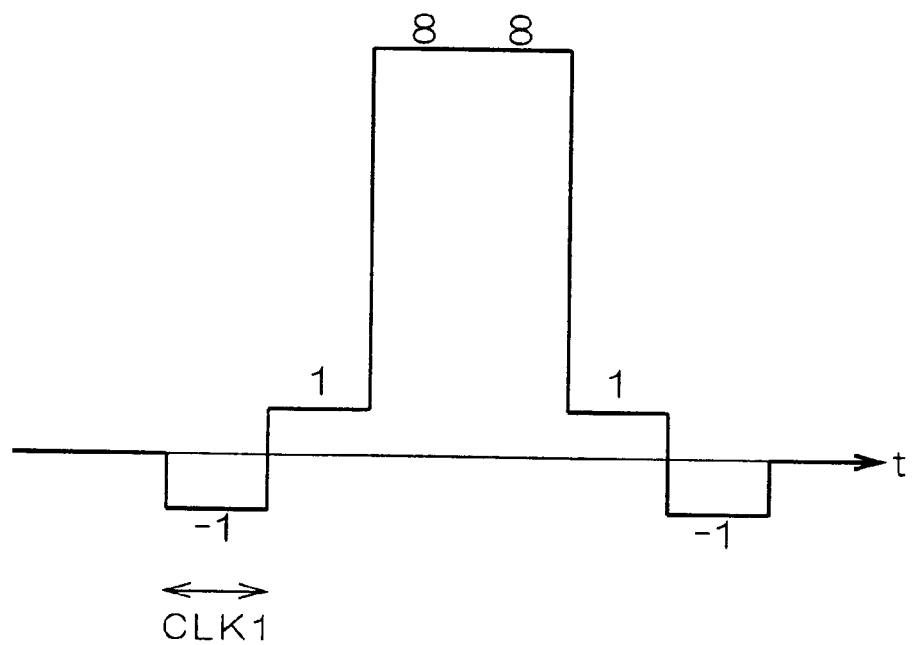
FIG. 3 shows a fundamental digital waveform used in an embodiment of the present invention.
Figure 5:
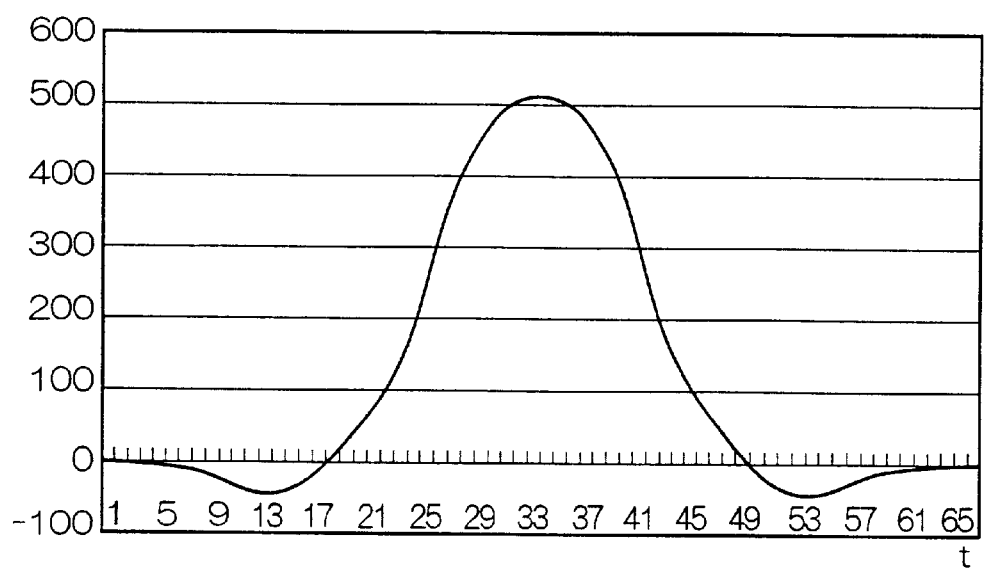
FIG. 5 shows the function generated from a fundamental digital waveform according to an embodiment of the present invention.

The D/A converter according to an embodiment of the present invention is described below in detail by referring to the attached drawings. FIGS. 1 and 2 show the configuration of the D/A converter according to an embodiment of the present invention. FIGS. 3 through 5 show the principle of the D/A conversion according to an embodiment of the present invention. First, the principle of the D/A conversion is described by referring to FIGS. 3 through 5.

FIG. 3 shows the fundamental digital waveform used in an embodiment of the present invention. The fundamental digital waveform shown in FIG. 3 is the base of the sampling function used when data interpolation is performed by the oversampling process. The fundamental digital waveform is generated by changing the data values for each clock CLK 1 of the reference frequency into −1, 1, 8, 8, 1, and −1.

In this example, the following processes are performed on the fundamental digital waveform as shown in FIG. 3 to explain the basic principle of the D/A converting operation according to an embodiment of the present invention.

First, the sampling process is performed on the digital data having the fundamental waveform as shown in FIG. 3 using a double frequency clock CLK 2, the obtained sample value is added to each value obtained by shifting the obtained sample value by a half clock (by a half phase) of the clock CLK 2, thereby performing the double oversampling process accompanied by the two-level convolution calculation using digital data.

Then, the sampling process is further performed using the double frequency clock CLK 3 on each data value obtained by the first oversampling process, the obtained sample value is added to each value obtained by shifting the obtained sample value by a half clock (by a half phase) of the clock CLK 3, thereby further performing the double oversampling process accompanied by the two-level convolution calculation as in the first oversampling process.

Furthermore, the sampling process is further performed using the double frequency clock CLK 4 on each data value obtained by the second oversampling process, the obtained sample value is added to each value obtained by shifting the obtained sample value by a half clock (by a half phase) of the clock CLK 4, thereby further performing again the double over sampling process accompanied by the two-level convolution calculation.

Thus, after repeating the double oversampling process and the two-level convolution calculation three times, an 8-level convolution calculation is performed on each data value obtained in the third convolution calculation using the clock CLK 4 having the same frequency as the clock signal used on the third oversampling with each sample value shifted by 1 clock.

Figures 4A, 4B, 4C, 4D:
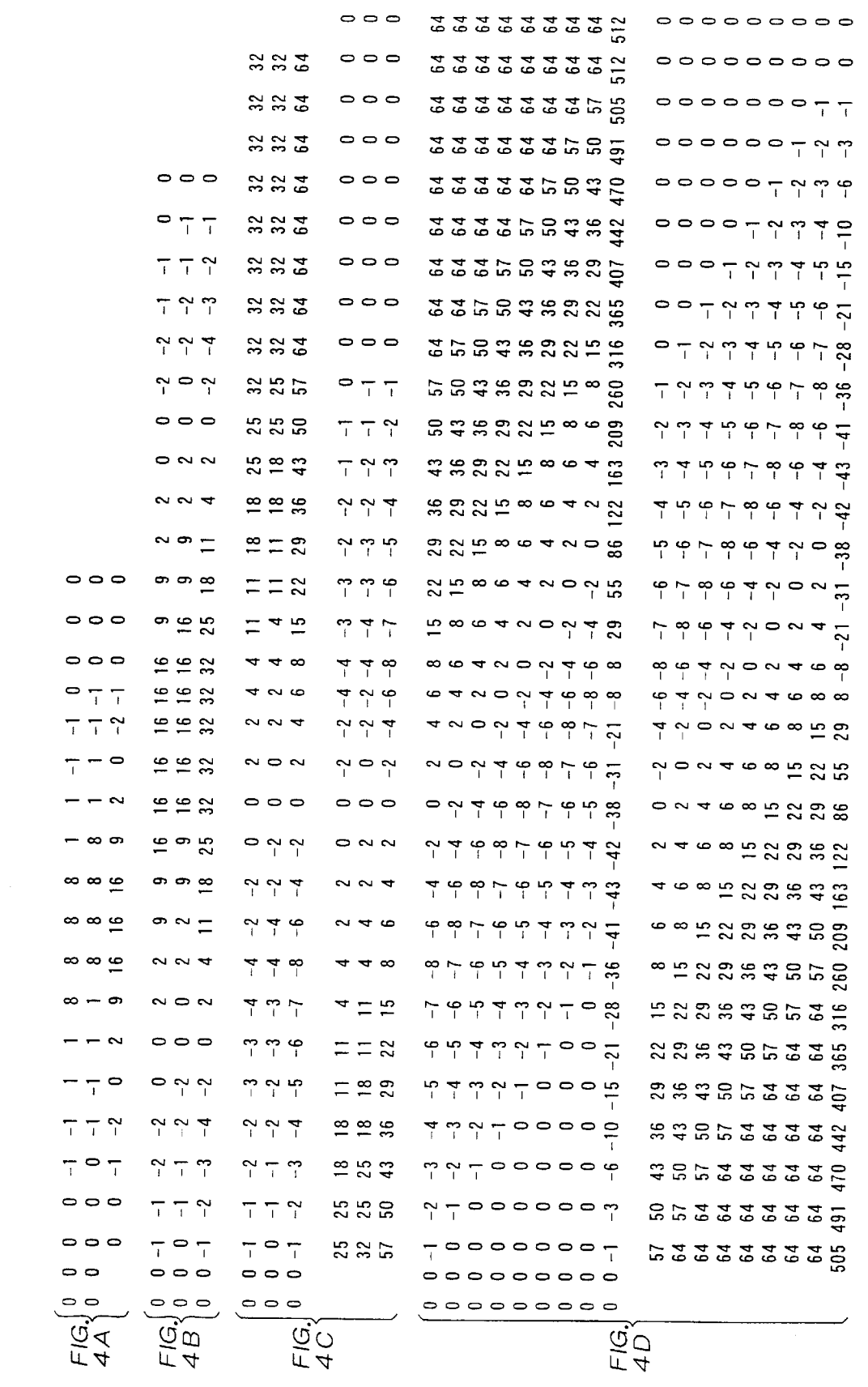

FIG. 4 shows the result of performing the above mentioned oversampling and convolution calculation on the fundamental digital waveform shown in FIG. 3. FIG. 4(A) shows the result of performing the first oversampling and convolution calculation. In FIG. 4(A), the first row of numbers shows the result of the double oversampling performed on the data value having the fundamental digital waveform shown in FIG. 3. The second row of numbers shows the result of shifting each sample value of the first row by half phase. The third row of numbers shows the result of adding each sample value in the first row to each sample value in the second row in the corresponding column.

FIG. 4(B) shows the result of performing the second oversampling and convolution calculation. In FIG. 4(B), the first row of numbers shows the result of performing the double oversampling on the data values in the third row in FIG. 4(A) obtained in the first oversampling and convolution calculation. The second row of numbers shows the result of shifting each sample value in the first row by half phase. The third row of numbers shows the result of adding each sample value in the first row to each sample value in the second row in the corresponding column.

FIG. 4(C) shows the result of performing the third oversampling and convolution calculation. In FIG. 4(C), the first row of numbers shows the result of performing the double oversampling on the data values in the third row shown in FIG. 4(B) obtained by the second oversampling and convolution calculation. The second row of numbers shows the result of shifting each sample value in the first row by half phase. Furthermore, the third row of numbers shows the result of adding each-sample value in the first row to each sample value in the second in the corresponding column. In the layout of the figure in FIG. 4(C), the set of the rows of numbers is arranged in two lines.

FIG. 4(D) shows the result of performing the 8-level convolution calculation. In FIG. 4(D), the first row of numbers shows the data values shown in the third row in FIG. 4(C) obtained by performing the third oversampling and convolution calculation, and the second through eighth rows of numbers show the results obtained by sequentially shifting each sample value in the first row by 1 clock. Furthermore, the ninth row of numbers shows the result of adding each sample value in the first through eighth rows in the corresponding column. Here again, the set of the rows of numbers is arranged in two lines.

When each sample value finally obtained in the ninth row in FIG. 4(D) is D/A converted and smoothed, the signal of a waveform function as shown in FIG. 5 can be obtained. The function shown in FIG. 5 can be differentiated once in the entire area, and indicates a finite value other than 0 when the sampling position t ranges from 1 to 65 along the horizontal axis. Outside the range, the values of the function are all 0.

It is assumed that a case where function values have finite values except zero in a local region and become zero outside the region is called a "local support."

Furthermore, the function shown in FIG. 5 is a sampling function characterized in that it is maximized at the sampling point t=33, and takes 0 at the four sampling points t=1, 17, 49, and 65. Thus, it passes all sampling points required to obtain smooth analog waveform signals.

Thus, the function shown in FIG. 5 is a sampling function, can be differentiated once in the entire area, and a function of a local support converging into 0 at the sampling points t=1 and 65. Therefore, by performing a combining process based on each piece of discrete data using the sampling function shown in FIG. 5 instead of the conventional sinc function shown in FIG. 7, a function which can be differentiated only once can be interpolated between pieces of discrete data.

However, according to an embodiment of the present invention, the combining process based on each pieces of discrete data is not performed after obtaining the sampling function as shown in FIG. 5 from the fundamental digital waveform shown in FIG. 3, but is performed before performing the above mentioned oversampling and convolution calculation using digital data as described later by referring to FIGS. 1 and 2. Therefore, only by performing the above mentioned oversampling and convolution calculation on the digital data obtained by combining each piece of discrete data, the result of combining the sampling function depending on the size of each piece of discrete data can be immediately obtained as shown in FIG. 8.

In order to obtain the interpolation value accurately with the sinc function which is used conventionally, since the sinc function converges to zero at sample points $t=\pm\infty$, it is necessary to calculate a value of the sinc function at an interpolating position according to each discrete data between $t=+\infty$ and performing convolution operation using these values. On the contrary, since the sampling function shown in FIG. 5 used in this embodiment converges to zero at sample points with $t=1$, and 65, it is sufficient to consider discrete data in the range between $t=1$ through 65.

Therefore, when an interpolation value is obtained, the limited number of discrete data values are to be considered, and the amount of processed data (computational complexity) can be considerably reduced, and the circuit scale ca be miniaturized. Furthermore, relating to the discrete data outside the range of $t=1$ to 65, it is not without consideration in terms of the computational complexity, precision, etc. in spite of its necessity to be considered, but it is theoretically unnecessary to consider the data. Therefore, no truncation error arises.

FIG. 1 shows the entire configuration of the D/A converter according to an embodiment of the present invention. The D/A converter shown in FIG.1 comprises a digital waveform generating section 10, a convolution calculation section 20, a D/A converting section 30 and LPF (low pass filter) 32. The digital waveform generating section 10 corresponds to the combining unit, a convolution calculating section 20 corresponds to the oversampling unit and the calculating unit of the present invention, a D/A converting section 30 and an LPF 32 correspond to the D/A converting unit of the present invention.

The configuration of the digital waveform generating section 10 is described later by referring to FIG. 2. The convolution calculating section 20 performs the oversampling and convolution calculation as described above by referring to FIG. 4, and generates. a digital data value at each sample point interpolated into the discrete data input into the digital waveform generating section 10. The D/A converting section 30 D/A converts each digital data value obtained by the convolution calculating section 20 (in this example, the interpolation is not performed by the conventional oversampling).

With the configuration of the convolution calculating section 20, a D-type flip-flop (hereinafter referred to as a D-FF) 1a holds the digital data output by the digital waveform generating section 10 in synchronization with the double frequency clock CLK 2. A D-FF 1b connected parallel to the D-FF 1a also holds the digital data output by the digital waveform generating section 10 in synchronization with the double frequency clock CLK 2. However, it holds the data at a timing of an inverted phase of the clock signal CLK 2.

An adder 2 adds up the digital data held by the two D-FFs 1a and 1b. These D-FFs 1a and 1b and the adder 2 configure the first calculating unit of the present invention, and perform the double oversampling on the digital data output by the digital waveform generating section 10, and the two-level convolution calculation by adding up the obtained sample value and each sample value obtained by shifting the obtained sample value by half phase (see FIG. 4(A)).

Two D-FFs 3a and 3b connected parallel after the adder 2 hold the digital data output by the adder 2 at a timing shifted by half phase in synchronization with the double frequency clock CLK 3. An adder 4 adds up the digital data values held in the above mentioned two D-FFs 3a and 3b.

These D-FFs 3a and 3b and the adder 4 configure the second calculating unit of the present invention, and further perform the double oversampling on the digital data obtained by the first convolution calculation, and the two-level convolution calculation by adding up each of the obtained values and each sample value obtained by shifting the obtained sample value by half phase (see FIG. 4(B)).

Two D-FFs 5a and 5b connected parallel after the adder 4 hold the digital data output by the adder 2 at a timing shifted by half phase in synchronization with the double frequency clock CLK 4. An adder 6 adds up the digital data values held in the above mentioned two D-FFs 5a and 5b.

These D-FFs 5a and 5b and the adder 6 configure the third calculating unit of the present invention, and further perform the double oversampling on the digital data obtained by the second convolution calculation, and the two-level convolution calculation by adding up each of the obtained values and each sample value obtained by shifting the obtained sample value by half phase (see FIG. 4(C)).

Thus, by repeating the double oversampling and the two-level convolution calculation three times, the 8-times oversampling is carried out on the digital data output by the digital waveform generating section 10. The above mentioned configuration in the convolution calculating section 20 corresponds to the oversampling unit of the present invention, and the remaining configuration described below corresponds to the calculating unit of the present invention.

Eight D-FFs 7a through 7h serially connected after the adder 6 delays the digital data output from the adder 6 one clock each piece in synchronization with the clock CLK 4 of 16-times frequency, and sequentially holds the data. These eight D-FFs 7a through 7h correspond to the plurality of delay unit. The remaining configuration described below corresponds to the adding unit of the present invention.

An adder 8a and a ½ multiplier 9a respectively adds up the digital data values held in D-FFs 7g and 7h, and multiplies the sum by ½. An adder 8b and a ½ multiplier 9b respectively adds up the digital data values held in D-FFs 7e and 7f, and multiplies the sum by ½. An adder 8c and a ½ multiplier 9c respectively adds up the digital data values held in D-FFs 7c and 7d, and multiplies the sum by ½. An adder 8d and a ½ multiplier 9d respectively adds up the digital data values held in D-FFs 7a and 7b, and multiplies the sum by ½.

An adder 8e and a ½ multiplier 9e respectively adds up the digital data values output from the two ½ multipliers 9a and 9b, and multiplies the sum by ½. An adder 8f and a ½ multiplier 9f respectively adds up the digital data values output from the two ½ multipliers 9c and 9d, and multiplies the sum by ½. An adder 8g adds up the digital data values output from the two ½ multipliers 9e and 9f, and provides the sum for the D/A converting section 30.

With the above mentioned configuration of the D-FFs 7a through 7h, the adders 8a through 8g, and the ½ multipliers 9a through 9f, the 8-level convolution calculation is performed on the digital data processed in the above mentioned 16-times oversampling by adding each sample value shifted by one clock each in synchronization with the 16-times frequency clock CLK 4 (see FIG. 4(D)). Each sample value of the obtained digital data is simply D/A converted by the D/A converting section 30, and the obtained analog signal is smoothed by an LPF 32, thereby continuously outputting smooth analog signal waveforms.

The configuration of the digital waveform generating section 10 is described below by referring to FIG. 2. In FIG. 2, three D-FFs 11a through 11c delay the digital discrete data to be D/A converted by shifting each piece of data by one clock in synchronization with the reference frequency clock CLK 0, and sequentially store the data. These three D-FFs 11a through 11c correspond to the n delay unit of the present invention. Furthermore, a −1-time multiplier 12a multiplies the data value stored in the D-FF 11a by −1, and a 1-time multiplier 13a multiplies the data value stored in the D-FF 11a by 1 (in this case, the data value is unchanged).

The products obtained by these multipliers 12a and 13a are switched at a ½ duty rate by a switch 14a in synchronization with the reference frequency clock CLK 0, and selectively output to an adder 16. The adder 16 receives a product obtained by an 8-times multiplier 15 in addition to the product obtained by the −1-time multiplier 12a or the 1-time multiplier 13a, and these two input values are added up and output. The 8-times multiplier 15 multiplies the data value held in a D-FF 11b by 8.

A −1-time multiplier 12b multiplies the data value stored in the D-FF 11c by −1, and a 1-time multiplier 13b multiplies the data value stored in the D-FF 11c by 1 (in this case, the data value is unchanged). The products obtained by these multipliers 12b and 13b are switched at a ½ duty rate by a switch 14b in synchronization with the reference frequency clock CLK 0, and selectively output to a D-FF 17a.

A D-FF 17a holds the product obtained by the −1-time multiplier 12a or the 1-time multiplier 13a selectively output by the switch 14b in synchronization with the double frequency clock CLK 1. A D-FF 17b holds the sum output by the adder 16 in synchronization with the double frequency clock CLK 1. An adder 18 and a D-FF 19 add up the data values output by the two D-FFs 17a and 17b, and hold the obtained value in synchronization with the double frequency clock CLK 1, and then output the result to the convolution calculating section 20 at the subsequent stage as shown in FIG. 1.

By processing the discrete data to b e D/A converted by the digital waveform generating section 10 with the above mentioned configuration, a result is provided in which the amplitude of the fundamental digital waveform shown in FIG. 3 is modulated depending on the size of each piece of discrete data, and then the 3-level convolution calculation is performed on the data values. As described above, according to the present embodiment, only the discrete data in the range of finite values other then 0 has to be considered among the sampling functions of a local support in obtaining one interpolation value. Therefore, in this example, three pieces of discrete data is used in the convolution calculation.

Figures 6A, 6B:
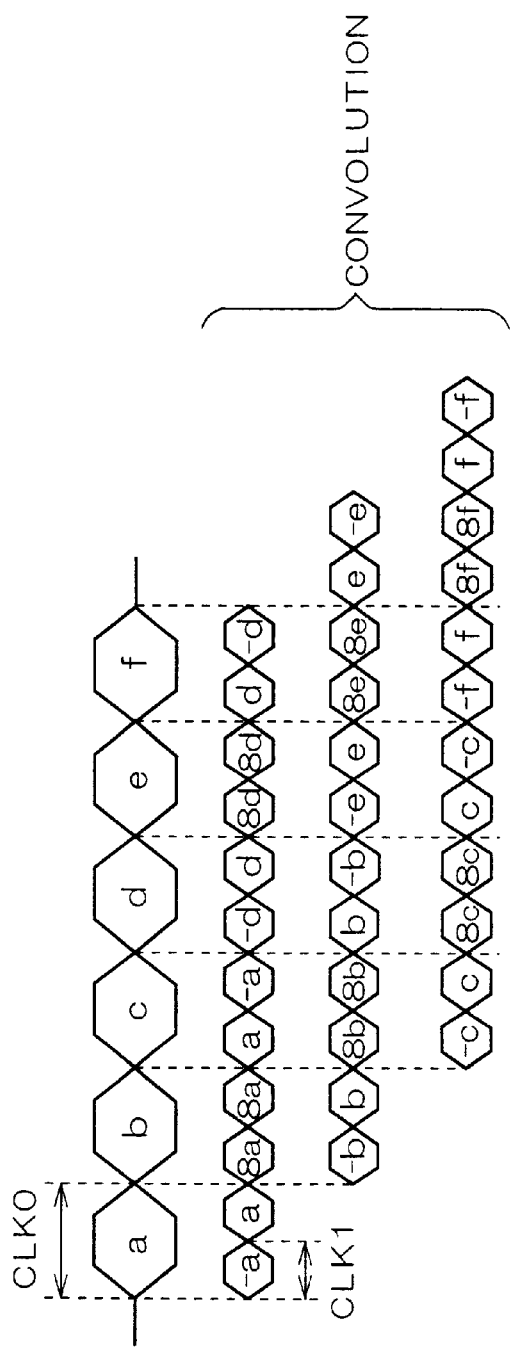
FIGS. 6A–6B shows the operation performed by the digital waveform generating section shown in FIG. 1.

FIG. 6 shows an example of the operation of the digital waveform generating section 10. FIG. 6(A) shows an example of the discrete data input to the digital waveform generating section 10. In FIG. 6(A), the horizontal axis indicates time, and the vertical axes (a through f) indicate the size of the discrete data. FIG. 6(B) shows the condition of modulating the amplitude of the fundamental digital waveform shown in FIG. 3 depending on the size (a through f) of the discrete data, and of processing the result in the convolution calculation. That is, the data values arranged vertically are added up and output.

By passing the result of the convolution calculation by the digital waveform generating section 10 to the convolution calculating section 20 shown in FIG. 1, the original discrete data is 16-times oversampled, thereby obtaining each interpolation value. Furthermore, the digital data containing each interpolation value is simply D/A converted by the D/A converting section 30, and the LPF 32 smoothes the converted analog signal, thereby continuously outputting the smooth analog signal waveforms as if oversampling had been performed based on the sampling function shown in FIG. 5.

As described above in detail, according to the present embodiment, the digital data having fundamental waveforms corresponding to the sampling function depending on the input discrete data are combined in the convolution calculation, and the obtained data values are processed in the oversampling and convolution calculation, thereby obtaining continuous interpolation values. Therefore, it is not necessary to convert sampling values in a wide range as in the case of the conventional interpolation calculation using a sinc function. As a result, the computational complexity and the circuit scale can be reduced.

The function generated from a fundamental digital waveform according to the present embodiment is a sampling function of a local support converging into 0 in the finite sampling position, and can be once differentiated. Therefore, the number of pieces of discrete data to be considered in obtaining one interpolation value can be limited, thereby reducing the computational complexity. Furthermore, since there is no truncation error occurring, a waveform can be output with less distortion. As a result, the quality of an output analog voice signal can be largely improved.

Additionally, according to the present embodiment, the continuous interpolation values required to obtain smooth analog signals are all obtained in the digital processes. Therefore, the computational complexity can be considerably reduced as compared with the conventional analog processes, and the present embodiment can be preferably applied to mass production using the IC systems.

The configuration, wiring, etc. of each part of the present embodiment are only examples embodying the present invention, and the present invention is not limited to these applications only. That is, the present invention can be implemented in various applications within the scope, gist, and features of the invention.

For example, the convolution calculating section 20 shown in FIG. 1 performs the double oversampling three times, but the present invention is not limited to the number of times. Additionally, the 8-level convolution calculation is performed after a total of 8-times over sampling. It is obvious that the number of levels is not limited, either. The circuit configuration for performing the above mentioned oversampling and convolution calculation is not limited to the example shown in FIG. 1. Furthermore, although the digital waveform generating section 10 shown in FIG. 2 performs the 3-level convolution calculation, but the present invention is not limited to the number of levels.

In the embodiment shown in FIG. 1, each interpolation value obtained by the digital waveform generating section 10 and the convolution calculating section 20 is finally D/A converted by the D/A converting section 30, and is smoothed by the LPF 32. However, each interpolation value output from the convolution calculating section 20 can be used in other digital processes without D/A conversion. That is, the configuration excluding the D/A converting section 30 and the LPF 32 in FIG. 1 can be used as a data interpolating device.

Furthermore, according to the embodiment shown in FIG. 1, the LPF 32 is connected at the subsequent stage of the D/A converting section 30. However, when a load having a large time constant (for example, a speaker, etc.) is connected to an output side, the load functions as a low pass filter. Therefore, the LPF 32 at the subsequent stage of the D/A converting section 30 can be omitted in the configuration of the D/A converter of the present invention.

Industrial Applicability

As described above, according to the present invention, digital data having fundamental waveforms depending on the input discrete data values are combined in the convolution calculation, then a digital interpolation value is obtained further in the oversampling and convolution calculation, and the obtained value is D/A converted into an analog signal to be output. According to the present invention, continuous interpolation values can be obtained only by performing the above mentioned digital processes. Therefore, it is not necessary to compute sampling values in a wide range as in the conventional interpolation calculation using a sinc function, thereby reducing the computational complexity and circuit scale.

Since the function generated from a fundamental digital waveform is a sampling function at of a local support according to the present invention, the number of pieces of discrete data required to obtain an interpolation value can be reduced. Furthermore, although the number of pieces of discrete data to be processed is reduced, there arises no truncation error, and a waveform can be output with little distortion. Therefore, the quality of an output analog voice signal can be largely improved.

What is claimed is:

1. A digital-analog converter, characterized in that digital data having fundamental waveforms corresponding to values of n pieces of input discrete data is combined in moving average calculation or convolution calculation, oversampling is carried out on the combined digital data values, moving average calculation or convolution calculation is performed on obtained data values to obtain digital interpolation values for the discrete data, and then each digital data value containing interpolation values is converted into an analog quantity.

2. A digital-analog converter, characterized by comprising:

combining unit for combining digital data having fundamental waveforms corresponding to the values of n pieces of input discrete data in the moving average calculation or the convolution calculation;

oversampling unit for sampling each input data value at a frequency double a level at a previous stage on digital data generated by said combining unit, adding each piece of obtained data values to each data value obtained by shifting the data values by a predetermined phase, outputting a result to a subsequent stage, and repeating these steps for several stages;

calculating unit for performing moving average calculation or convolution calculation on each data value obtained by said oversampling unit at several stages; and D/A converting unit for converting each data value obtained by said calculating unit into an analog quantity.

3. A digital-analog converter, characterized by comprising:

combining unit for combining data by adding digital data having fundamental waveforms corresponding to the values of n pieces of discrete data input in synchronization with a reference frequency clock with the digital data shifted by reference frequency clock;

oversampling unit for sampling each input data value at a frequency clock double a level at a previous stage on the digital data generated by said combining unit, adding each obtained data value to each data value obtained by shifting the data values by a half clock, outputting a result to a subsequent stage, and repeating these steps for several stages;

calculating unit for performing moving average calculation or convolution calculation at several stages by adding each data value with a value shifted by 1 clock in synchronization with a frequency clock at a final stage of said oversampling unit to each data value obtained by said oversampling unit; and D/A converting unit for converting each data value obtained by said calculating unit into an analog quantity.

4. The digital-analog converter according to claim 3, characterized in that said combining unit comprises:
n delay unit for sequentially delaying discrete data sequentially input in synchronization with a reference frequency clock by the reference frequency clock; and
sum-of-products unit for multiplying each data value output from said n delay unit by each gain value corresponding to a fundamental digital waveform, adding up obtained multiplication results, and outputting a result to said oversampling unit.

5. The digital-analog converter according to claim 3, characterized in that said oversampling unit comprises:
first calculating unit for sampling each data value of digital data generated by said combining unit in synchronization with a frequency clock double a reference frequency, and adding each data value to a value obtained by shifting each data value by a half clock;
second calculating unit for sampling each data value obtained by said first calculating unit in synchronization with the frequency clock four times as high as the reference frequency, and adding each data value to a value obtained by shifting each data value by a half clock; and
third calculating unit for sampling each data value obtained by said second calculating unit in synchronization with the frequency clock eight times as high as the reference frequency, and adding each data value to a value obtained by shifting each data value by a half clock.

6. The digital-analog converter according to claim 3, characterized in that said calculating unit comprises:
a plurality of delay unit for sequentially delaying the digital data obtained by said oversampling unit by a value of the frequency clock at a final stage of said oversampling unit; and
adding unit for adding up output from said plurality of delay unit and outputting a result.

7. A digital-analog converting method, characterized by comprising:
   a combining step of combining digital data having fundamental waveforms corresponding to values of n pieces of input discrete data in moving average calculation or convolution calculation;
   an oversampling step of performing oversampling accompanies by the moving average calculation or the convolution calculation on the combined digital data values;
   a calculating step of obtaining digital interpolation values for the discrete data by performing the moving average calculation or the convolution calculation on the data values obtained by the oversampling; and
   a D/A converting step of converting each digital data value containing the interpolation values obtained in the calculation into an analog quantity.

8. A data interpolating device, characterized in that digital data having fundamental waveforms corresponding to values of n pieces of input discrete data is combined in moving average calculation or convolution calculation, oversampling is carried out on the combined digital data values, and the moving average calculation or the convolution calculation is performed on obtained data values to obtain digital interpolation values for the discrete data.

9. A data interpolating device, characterized by comprising:
   combining unit for combining digital data having fundamental waveforms corresponding to the values of n pieces of input discrete data in the moving average calculation or the convolution calculation;
   oversampling unit for sampling each input data value at a frequency double a level at a previous stage on digital data generated by said combining unit, adding each piece of obtained data values to each data value obtained by shifting the data values by a predetermined phase, outputting a result to a subsequent stage, and repeating these steps for several stages; and
   calculating unit for performing moving average calculation or convolution calculation on each data value obtained by said oversampling unit at several stages.

10. A data interpolating device, characterized by comprising:
    combining unit for combining data by adding digital data having fundamental waveforms corresponding to the values of n pieces of discrete data input in synchronization with a reference frequency clock with the digital data shifted by reference frequency clock;
    oversampling unit for sampling each input data value at a frequency clock double a level at a previous stage on the digital data generated by said combining unit, adding each obtained data value to each data value obtained by shifting the data values by a half clock, outputting a result to a subsequent stage, and repeating these steps for several stages; and
    calculating unit for performing moving average calculation or convolution calculation at several stages by adding each data value with a value shifted by 1 clock in synchronization with a frequency clock at a final stage of said oversampling unit to each data value obtained by said oversampling unit.

11. The data interpolating device according to claim 10, characterized in that
    said combining unit comprises:
       n delay unit for sequentially delaying discrete data sequentially input in synchronization with a reference frequency clock by the reference frequency clock; and
       sum-of-products unit for multiplying each data value output from said n delay unit by each gain value corresponding to a fundamental digital waveform, adding up obtained multiplication results, and outputting a result to said oversampling unit.

12. The data interpolating device according to claim 10, characterized in that
    said oversampling unit comprises:
       first calculating unit for sampling each data value of digital data generated by said combining unit in synchronization with a frequency clock double a reference frequency, and adding each data value to a value obtained by shifting each data value by a half clock;
       second calculating unit for sampling each data value obtained by said first calculating unit in synchronization with the frequency clock four times as high as the reference frequency, and adding each data value to a value obtained by shifting each data value by a half clock; and
       third calculating unit for sampling each data value obtained by said second calculating unit in synchronization with the frequency clock eight times as high as the reference frequency, and adding each data value to a value obtained by shifting each data value by a half clock.

13. The data interpolating device according to claim 10, characterized in that
    said calculating unit comprises:
       a plurality of delay unit for sequentially delaying the digital data obtained by said oversampling unit by a value of the frequency clock at a final stage of said oversampling unit; and
       adding unit for adding up output from said plurality of delay unit and outputting a result.

14. A data interpolating method, characterized by comprising:
    a combining step of combining digital data having fundamental waveforms corresponding to values of n pieces of input discrete data in moving average calculation or convolution calculation;
    an oversampling step of performing oversampling accompanies by the moving average calculation or the convolution calculation on the combined digital data values; and
    a calculating step of obtaining digital interpolation values for the discrete data by performing the moving average calculation or the convolution calculation on the data values obtained by the oversampling.

* * * * *